US012682730B2

(12) United States Patent
Wang et al.

(10) Patent No.: US 12,682,730 B2
(45) Date of Patent: Jul. 14, 2026

(54) SYSTEM AND METHOD FOR CONVERTING VIBRATION SIGNAL, AND RELATED DEVICE

(71) Applicant: AAC Acoustic Technologies (Shanghai) Co., Ltd., Shanghai (CN)

(72) Inventors: Xiuyue Wang, Shanghai (CN); Zhipeng Ye, Shanghai (CN); Yulei Zhang, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 13 days.

(21) Appl. No.: 18/797,495

(22) Filed: Aug. 7, 2024

(65) Prior Publication Data

US 2025/0218260 A1 Jul. 3, 2025

Related U.S. Application Data

(63) Continuation of application No. PCT/CN2023/143056, filed on Dec. 29, 2023.

(51) Int. Cl.
*G08B 6/00* (2006.01)
*A63F 13/22* (2014.01)
*A63F 13/285* (2014.01)

(52) U.S. Cl.
CPC ............... *G08B 6/00* (2013.01); *A63F 13/22* (2014.09); *A63F 13/285* (2014.09)

(58) Field of Classification Search
CPC .......... G08B 6/00; A63F 13/22; A63F 13/285; G06F 3/016
See application file for complete search history.

(56) References Cited

U.S. PATENT DOCUMENTS

2015/0273322 A1* 10/2015 Nakagawa ............ A63F 13/285
463/37
2016/0179220 A1* 6/2016 Venkatesan ............. A63F 13/23
345/156

FOREIGN PATENT DOCUMENTS

CN        1299479 A  *  6/2001   .............. G06F 3/011
CN       111580647 A  *  8/2020   .............. G06F 3/016

* cited by examiner

*Primary Examiner* — Rufus C Point
(74) *Attorney, Agent, or Firm* — Wiersch Law Group

(57) ABSTRACT

Disclosed is a system and method for converting a vibration signal. The system includes a signal acquisition module and a signal conversion module. The signal acquisition module is configured to dock an application to acquire original vibration signal data in the application and to convert the original vibration signal data into preset protocol vibration signal data according to a preset protocol format. The signal conversion module is configured to convert the preset protocol vibration signal data into processed vibration signal data corresponding to a vibration unit according to a preset signal generation method, and to output the processed vibration signal data into the vibration unit to drive the vibration unit to generate vibration. The system can set vibration frequencies according to different applications, so that a user feels a vibration effect satisfying an application scenario from the controller with the vibration unit, the user experience is improved.

5 Claims, 4 Drawing Sheets

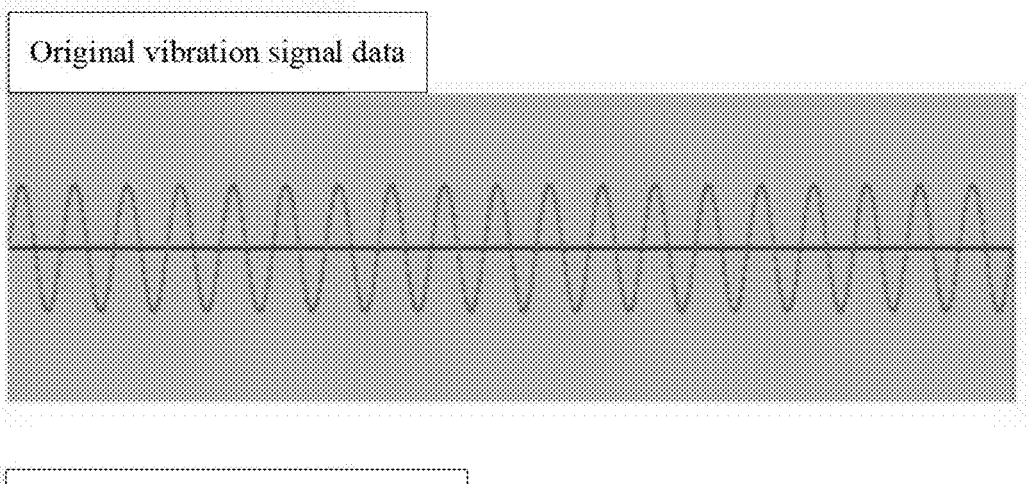
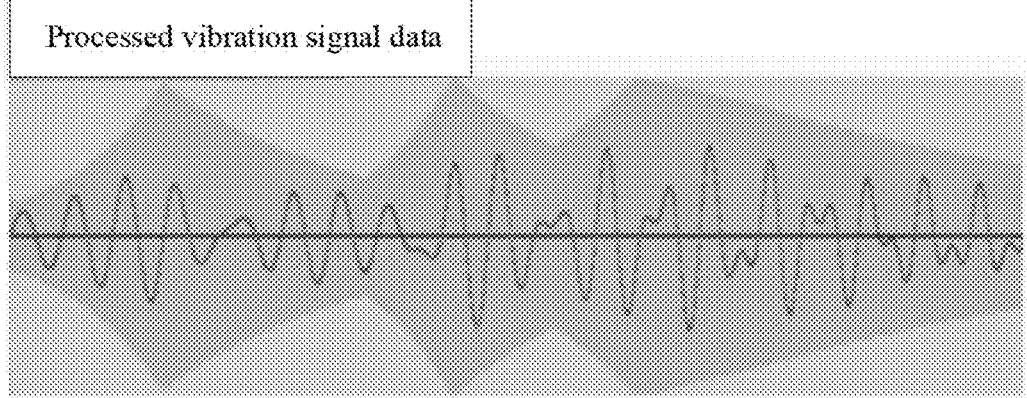
FIG. 2

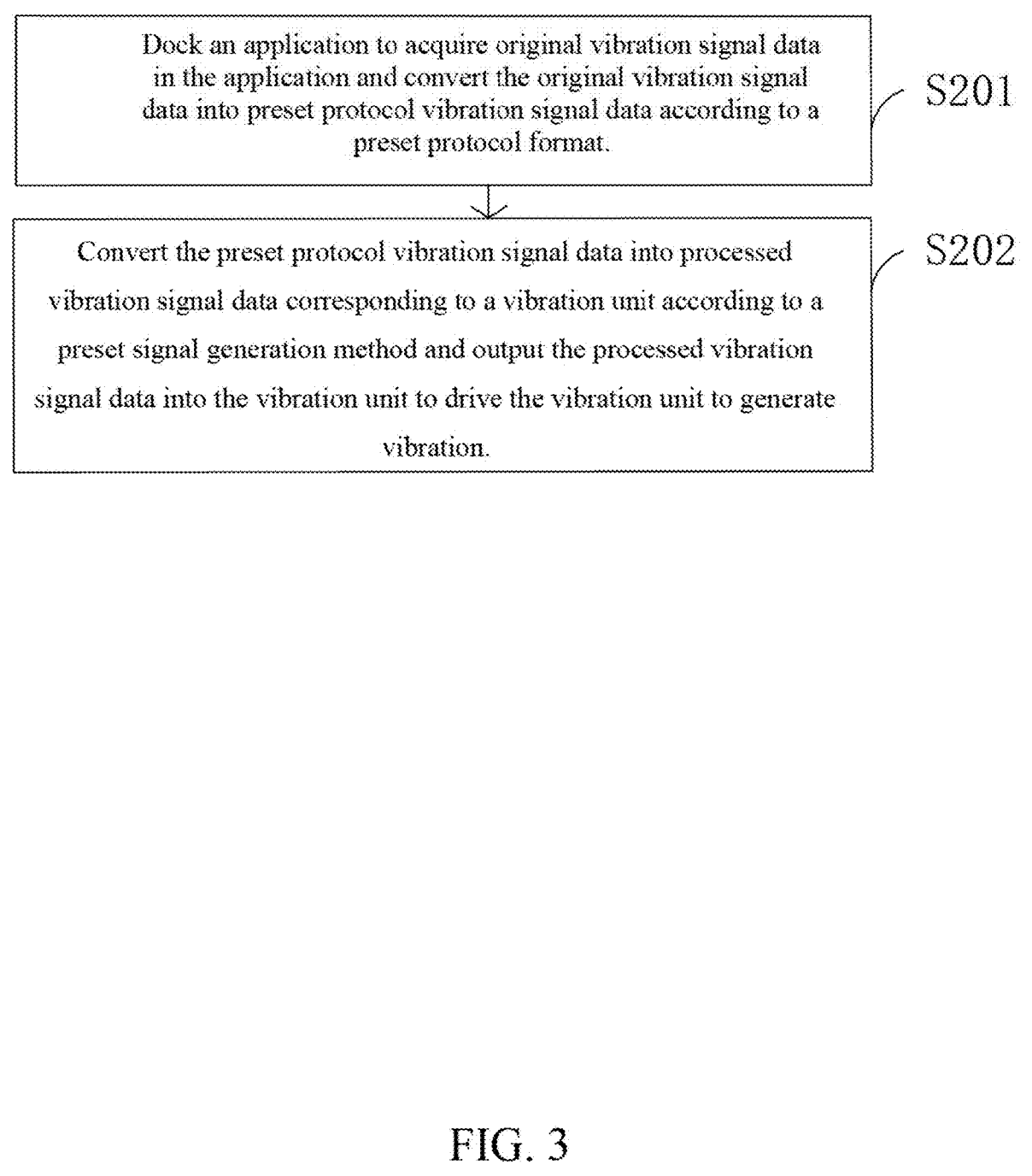

Dock an application to acquire original vibration signal data in the application and convert the original vibration signal data into preset protocol vibration signal data according to a preset protocol format. — S201

Convert the preset protocol vibration signal data into processed vibration signal data corresponding to a vibration unit according to a preset signal generation method and output the processed vibration signal data into the vibration unit to drive the vibration unit to generate vibration. — S202

FIG. 3

SYSTEM AND METHOD FOR CONVERTING VIBRATION SIGNAL, AND RELATED DEVICE

CROSS REFERENCE TO RELATED APPLICATIONS

The present application is a continuation of PCT Patent Application No. PCT/CN2023/143056 entitled "SYSTEM AND METHOD FOR CONVERTING VIBRATION SIG-NAL, AND RELATED DEVICE," filed Dec. 29, 2023, which is incorporated by reference herein in its entirety.

TECHNICAL FIELD

The present disclosure relates to the technical field of signal processing, and in particular to a system and method for converting a vibration signal, and a related device.

BACKGROUND

The sense of touch is a significant way of information transmission for people to perceive the world, which can bring people accurate judgment and abundant information prompting. With continuous emergence of markets such as mobile phone industry, game industry, and virtual reality (VR) industry, tactile feedback in the vibration form is widely used in consumer electronics products. Particularly, tactile feedback in personal computer (PC) terminals manipulated by controllers such as gamepads is increasingly concerned by game players.

In the related art, a vibrating application programming interface (API) used for applications (for example PC terminal game applications) is only Rumble. A Rumble interface only can input and output vibration intensity signals and cannot adjust the vibration frequency. Therefore, the vibration experience is relatively monotonous when users play the PC terminal games with operating devices with vibration functions such as the gamepads.

Therefore, it is necessary to provide a novel system for converting a vibration signal to solve the above problem.

SUMMARY

The present disclosure is to provide a system for converting a vibration signal and a method, and a related device.

In order to solve the above technical problem, in a first aspect, some embodiments of the present disclosure provide a system for converting a vibration signal. The system for converting a vibration signal includes a signal acquisition module and a signal conversion module. The signal acquisition module is configured to dock an application to acquire original vibration signal data in the application, to convert the original vibration signal data into preset protocol vibration signal data according to a preset protocol format, and to transmit the preset protocol vibration signal data to a signal conversion module. The signal conversion module, configured to convert the preset protocol vibration signal data into processed vibration signal data corresponding to a vibration unit according to a preset signal generation method, and to output the processed vibration signal data into the vibration unit to drive the vibration unit to generate vibration.

As an improvement, the signal acquisition module includes a vibration mode matching submodule, an adaptive interface processing submodule, and an adaptive protocol processing submodule. The vibration mode matching submodule is configured to select a corresponding preset vibration mode according to a type of the application, and to transmit the preset vibration mode to the signal conversion module. The adaptive interface processing submodule is configured to acquire the original vibration signal data in the application. The adaptive protocol processing submodule is configured to convert the original vibration signal data into the preset protocol vibration signal data according to the preset protocol format, and to transmit the preset protocol vibration signal data to the signal conversion module.

As an improvement, the signal conversion module includes a driving submodule, a protocol processing submodule, a mode switching submodule, an adaptive conversion parameter generation submodule, and a signal generation submodule. The driving submodule is configured to dock the vibration unit, and to drive the vibration unit to generate vibration according to the processed vibration signal data. The protocol processing submodule is configured to consult the preset protocol format with the adaptive protocol processing submodule, and to receive the preset protocol vibration signal data sent by the adaptive protocol processing submodule. The mode switching submodule is configured to receive the preset vibration mode sent by the vibration mode matching submodule. The adaptive conversion parameter generation submodule, configured to dock the driving submodule to acquire preset parameters of the vibration unit, and to generate conversion algorithm parameters according to the preset parameters. The signal generation submodule is configured to generate the processed vibration signal data by the preset signal generation method according to the preset protocol vibration signal data, the preset vibration mode, and the preset parameters.

As an improvement, the preset signal generation method includes the following operations as follows. Split and encoding the preset protocol vibration signal data to obtain code rate data. Encode the code rate data according to the preset vibration mode and the conversion algorithm parameters to obtain waveform data. Output the waveform data as the processed vibration signal data capable of being identified by the vibration unit.

As an improvement, the preset vibration mode is selected according to at least one of the following factors: an application size, an application name, and an application type of the corresponding application, and matched with corresponding vibration frequency data.

As an improvement, the preset parameters include at least one of vibration parameters, a driving data format, and a driving unit temperature of the vibration unit.

As an improvement, the format of the original vibration signal data is a Rumble format.

In a second aspect, some embodiments of the present disclosure further provide a method for converting a vibration signal, including the following operations: Dock an application to acquire original vibration signal data in the application and convert the original vibration signal data into preset protocol vibration signal data according to a preset protocol format. Convert the preset protocol vibration signal data into processed vibration signal data corresponding to a vibration unit according to a preset signal generation method and output the processed vibration signal data into the vibration unit to drive the vibration unit to generate vibration.

In a third aspect, some embodiments of the present disclosure further provide a computer device, including: a memory, a processor, and a vibration signal conversion program stored in the memory and executable by the processor, causing when executed the vibration signal conversion program, the processor implementing operations in the above method for converting a vibration signal.

In a fourth aspect, some embodiments of the present disclosure further provide a non-transitory computer-readable storage medium, having a touch identification program of a conjoined side button stored therein, when executed by the processor, the touch identification program of the conjoined side button implementing steps in the above method for converting a vibration signal.

Compared with the related art, the system for converting a vibration signal includes a signal acquisition module and a signal conversion module. The signal acquisition module is configured to dock an application to acquire original vibration signal data in the application, to convert the original vibration signal data into preset protocol vibration signal data according to a preset protocol format, and to transmit the preset protocol vibration signal data to a signal conversion module. The signal conversion module is configured to convert the preset protocol vibration signal data into processed vibration signal data corresponding to a vibration unit according to a preset signal generation method, and to output the processed vibration signal data into the vibration unit to drive the vibration unit to generate vibration. The above system can set outputted vibration signal data according to the application or parameters of a controller with the vibration unit, so as to set different vibration frequencies according to different applications, so that a user feels a vibration effect satisfying an application scenario from the controller with the vibration unit, and therefore, the user experience is improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without making creative efforts.

FIG. 2 is a schematic diagram of processed vibration signal data generated in the present disclosure;

FIG. 3 is a schematic block diagram of steps of a method for converting a vibration signal provided by an embodiment of the present disclosure.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

First Embodiment

Figure 1:
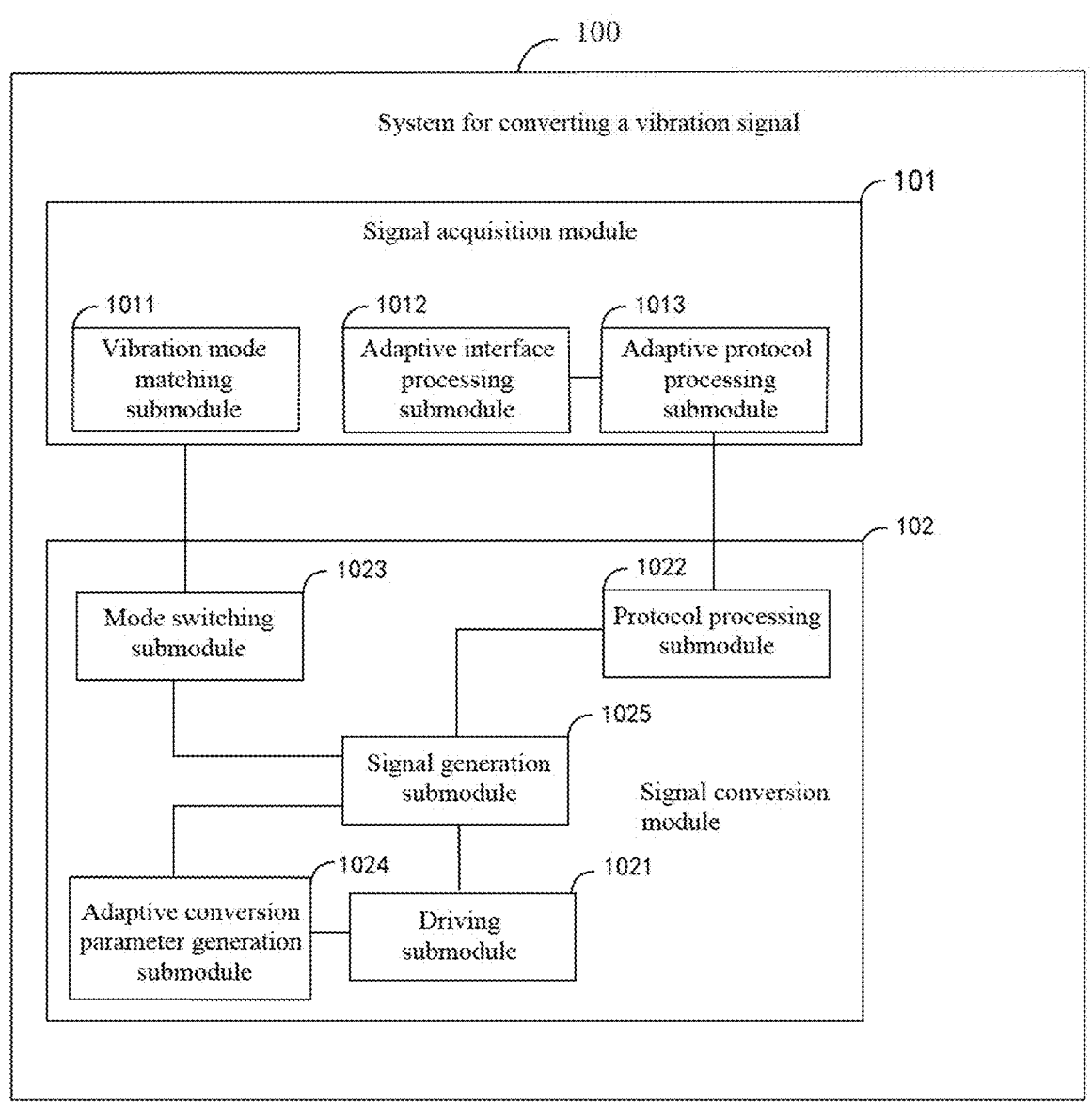
FIG. 1 is a schematic structural diagram of a system for converting a vibration signal provided by an embodiment of the present disclosure.

The present disclosure provides a system for converting a vibration signal. Referring to FIG. 1, FIG. 1 is a schematic structural diagram of a system for converting a vibration signal provided by an embodiment of the present disclosure. The system for converting a vibration signal 100 includes a signal acquisition module 101 and a signal conversion module 102.

The signal acquisition module 101 is configured to dock an application to acquire original vibration signal data in the application, to convert the original vibration signal data into preset protocol vibration signal data according to a preset protocol format, and to transmit the preset protocol vibration signal data to the signal conversion module 102.

In one example, the format of the original vibration signal data is a Rumble format.

The signal conversion module 102 is configured to convert the preset protocol vibration signal data into processed vibration signal data corresponding to a vibration unit according to a preset signal generation method, and to output the processed vibration signal data into the vibration unit to drive the vibration unit to generate vibration.

Specifically, in the embodiment of the present disclosure, the signal acquisition module 101 may be installed in a same system platform with the application to mainly acquire the data in the Rumble format issued by the Rumble interface of the application (i.e., vibration data with only intensity parameter).

The signal acquisition module 101 includes a vibration mode matching submodule 1011, an adaptive interface processing submodule 1012, and an adaptive protocol processing submodule 1013.

The vibration mode matching submodule 1011 is configured to select a corresponding preset vibration mode according to a type of the application, and to transmit the preset vibration mode to the signal conversion module, where the preset vibration mode is selected according to at least one of the following factors: an application size, an application name, and an application type of the corresponding application, and matched with corresponding vibration frequency data.

The adaptive interface processing submodule 1012 is configured to acquire the original vibration signal data in the application.

The adaptive protocol processing submodule 1013 is configured to convert the original vibration signal data into the preset protocol vibration signal data according to the preset protocol format, and to transmit the preset protocol vibration signal data to the signal conversion module.

For the adaptive protocol processing submodule 1013, the data formats are not unified because the application may use API interfaces (such as an XINPUT interface) of different protocol types. Therefore, it is necessary to convert the data format of the original protocol into the preset protocol format set in the embodiment of the present disclosure.

Due to different types of the applications, the vibration data of the finally generated processed vibration signal data are different as well. More specifically, on a basis of the original vibration intensity, an object of the embodiment of the present disclosure is to convert an original signal with only vibration intensity into a signal (i.e., the processed vibration signal data) with both intensity and frequency. This frequency may be user-defined, so that the frequency is adjusted conveniently in different applications. For example, for a game application, a preset powerful mode may enhance the vibration frequency on a basis of the original signal, which is suitable for a game with a boisterous impression. Or a soft mode is set to weaken the vibration frequency on the basis of the original signal, which is suitable for a game with a soft impression. The type of the preset vibration mode may be set according to an actual demand, which is not specifically limited herein.

In the embodiment of the present disclosure, the signal conversion module 102 may be either integrated in a control device or installed in the control device in an externally connecting manner, to mainly convert the acquired Rumble data into the processed vibration signal data (the vibration data with intensity and frequency parameters) according to the preset signal generation method.

The signal conversion module 102 includes a driving submodule 1021, a protocol processing submodule 1022, a mode switching submodule 1023, an adaptive conversion parameter generation submodule 1024, and a signal generation submodule 1025.

The driving submodule 1021 is configured to dock the vibration unit, and to drive the vibration unit to generate vibration according to the processed vibration signal data.

The protocol processing submodule 1022 is configured to consult the preset protocol format with the adaptive protocol processing submodule, and to receive the preset protocol vibration signal data sent by the adaptive protocol processing submodule 1012.

The mode switching submodule 1023 is configured to receive the preset vibration mode sent by the vibration mode matching submodule 1011.

The adaptive conversion parameter generation submodule 1024 is configured to dock the driving submodule 1021 to acquire preset parameters of the vibration unit, and to generate conversion algorithm parameters according to the preset parameters, where the preset parameters include at least one of vibration parameters, a driving data format, and a driving unit temperature of the vibration unit, and the vibration parameters are used to optimize signals for different vibration unit types.

The signal generation submodule 1025 is configured to generate the processed vibration signal data by the preset signal generation method according to the preset protocol vibration signal data, the preset vibration mode, and the preset parameters.

The preset signal generation method includes the following operations:

Split and encode the preset protocol vibration signal data to obtain code rate data.

Encode the code rate data according to the preset vibration mode and the conversion algorithm parameters to obtain waveform data.

Output the waveform data as the processed vibration signal data capable of being identified by the vibration unit.

Because the driving modes of the vibration units of different control devices may be different, it need to generate the processed vibration signal data in corresponding formats corresponding to the parameters of the vibration units. For example, an audio driver will generate formats such as wa, ogg, and mp3. As shown in FIG. 2, compared with the original vibration signal data with relatively monotonous original frequency, the vibration frequency of the processed vibration signal data generated by the system for converting a vibration signal provided by the embodiment of the present disclosure is more abundant, with a stronger sense of depth.

Compared with the related art, the system for converting a vibration signal includes: a signal acquisition module, configured to dock an application to acquire original vibration signal data in the application, to convert the original vibration signal data into preset protocol vibration signal data according to a preset protocol format, and to transmit the preset protocol vibration signal data to a signal conversion module; and a signal conversion module, configured to convert the preset protocol vibration signal data into processed vibration signal data corresponding to a vibration unit according to a preset signal generation method, and to output the processed vibration signal data into the vibration unit to drive the vibration unit to generate vibration. The above system can set outputted vibration signal data according to the application or parameters of a controller with the vibration unit, so as to set different vibration frequencies according to different applications, so that a user feels a vibration effect satisfying an application scenario from the controller with the vibration unit, and therefore, the user experience is improved.

Second Embodiment

The present disclosure further provides a method for converting a vibration signal. Referring to FIG. 3, FIG. 3 is a schematic block diagram of steps of a method for converting a vibration signal provided by an embodiment of the present disclosure. The method for converting a vibration signal includes the following operations:

S201: Dock an application to acquire original vibration signal data in the application and convert the original vibration signal data into preset protocol vibration signal data according to a preset protocol format.

S202: Convert the preset protocol vibration signal data into processed vibration signal data corresponding to a vibration unit according to a preset signal generation method and output the processed vibration signal data into the vibration unit to drive the vibration unit to generate vibration.

In the method for converting a vibration signal in the embodiment of the present disclosure, operation S201 is implemented based on an application terminal, and operation S202 is implemented based on a control terminal.

Specifically, operation S201 includes the following sub-operations:

S2011: Select a corresponding preset vibration mode according to a type of the application.

S2012: Acquire the original vibration signal data in the application.

S2013: Convert the original vibration signal data into the preset protocol vibration signal data according to the preset protocol format.

Operation S202 includes the following suboperations:

S2021: Receive the preset protocol vibration signal data.

S2022: Receive the preset vibration mode.

S2023: Acquire preset parameters of the vibration unit, and generate conversion algorithm parameters according to the preset parameters.

S2024: Generate the processed vibration signal data by the preset signal generation method according to the preset protocol vibration signal data, the preset vibration mode, and the preset parameters.

S2025: Dock the vibration unit, and drive the vibration unit to generate vibration according to the processed vibration signal data.

The method for converting a vibration signal is implemented based on the system for converting a vibration signal 100 in the above embodiment and can implement the same technical effect based on the corresponding modules with reference to descriptions in the above embodiment, which is not repeatedly described herein.

Third Embodiment

Figure 4:
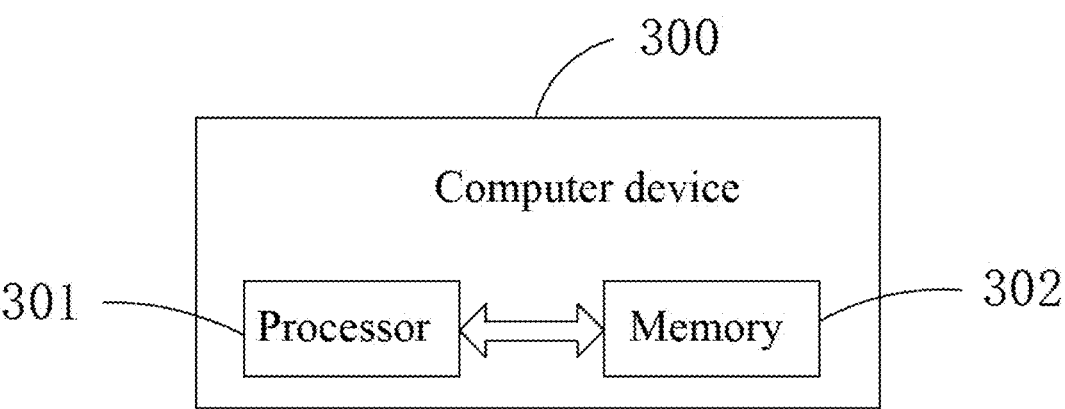
FIG. 4 is a schematic structural diagram of a computer device provided by an embodiment of the present disclosure.

The embodiment of the present disclosure further provides a computer device. Referring to FIG. 4, FIG. 4 is a schematic structural diagram of a computer device provided by an embodiment of the present disclosure. The computer device 300 includes: a memory 302, a processor 301, and a vibration signal conversion program stored in the memory 302 and executable by the processor 301.

The processor 301 calls the vibration signal conversion program stored in the memory 302 to execute the operations in the method for converting a vibration signal provided by the embodiment of the present disclosure. In combination with FIG. 3 and FIG. 4, the method specifically includes the following operations:

S201: Dock an application to acquire original vibration signal data in the application and convert the original vibration signal data into preset protocol vibration signal data according to a preset protocol format.

S202: Convert the preset protocol vibration signal data into processed vibration signal data corresponding to a vibration unit according to a preset signal generation method and output the processed vibration signal data into the vibration unit to drive the vibration unit to generate vibration.

In the method for converting a vibration signal in the embodiment of the present disclosure, operation S201 is implemented based on the computer device at an application terminal, and operation S202 is implemented based on the computer device at a control terminal.

Specifically, operation S201 includes the following sub-operations:

S2011: Select a corresponding preset vibration mode according to a type of the application.

S2012: Acquire the original vibration signal data in the application.

S2013: Convert the original vibration signal data into preset protocol vibration signal data according to the preset protocol format.

Operation S202 includes the following suboperations:

S2021: Receive the preset protocol vibration signal data.

S2022: Receive the preset vibration mode.

S2023: Acquire preset parameters of the vibration unit, and generate conversion algorithm parameters according to the preset parameters.

S2024: Generate the processed vibration signal data by the preset signal generation method according to the preset protocol vibration signal data, the preset vibration mode, and the preset parameters.

S2025: Dock the vibration unit, and drive the vibration unit to generate vibration according to the processed vibration signal data.

The computer device 300 provided by the embodiment of the present disclosure can implement the operations in the method for converting a vibration signal in the above embodiments and can implement the same technical effect with reference to descriptions in the above embodiments, which is not repeatedly described herein.

Fourth Embodiment

The embodiment of the present disclosure further provides a non-transitory computer-readable storage medium, having a vibration signal conversion program stored therein. When executed by the processor, the vibration signal conversion program implements various processes and operations in the method for converting a vibration signal provided by the embodiment of the present disclosure and can implement the same technical effect, which is not repeatedly described herein to avoid repetition.

It is to be noted that the terms "include", "comprise", or any other variation thereof in this specification are intended to cover a non-exclusive inclusion, such that a process, method, article, or apparatus that includes a list of elements not only includes those elements but also includes other elements not expressly listed or inherent to such process, method, article, or apparatus. An element proceeded by "includes a . . . " does not, without more constraints, preclude the existence of additional identical elements in the process, method, article, or apparatus that includes the element.

According to the descriptions in the above implementations, a person skilled in the art may clearly learn that the method according to the foregoing embodiment may be implemented by relying on software and a necessary general hardware platform, certainly the method can also be implemented by hardware, but in many cases, the former is the better embodiment. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The above is merely implementations of the present disclosure. It is to be noted that a person of ordinary skill in the art may make improvements without departing from the concept of the present disclosure and the improvements shall fall within the protection scope of the present disclosure.

What is claimed is:

1. A system for converting a vibration signal, comprising a signal acquisition module and a signal conversion module;

a signal acquisition module being configured to acquire original vibration signal data in an application, to convert the original vibration signal data into preset protocol vibration signal data according to a preset protocol format, and to transmit the preset protocol vibration signal data to the signal conversion module; and the signal conversion module being configured to convert the preset protocol vibration signal data into processed vibration signal data corresponding to a vibration unit according to a preset signal generation method and to output the processed vibration signal data into the vibration unit to drive the vibration unit to generate vibration;

wherein the signal acquisition module comprises:

a vibration mode matching submodule, configured to select a corresponding preset vibration mode according to a type of the application, and to transmit the preset vibration mode to the signal conversion module;

an adaptive interface processing submodule, configured to acquire the original vibration signal data in the application; and an adaptive protocol processing submodule, configured to convert the original vibration signal data into the preset protocol vibration signal data according to the preset protocol format, and to transmit the preset protocol vibration signal data to the signal conversion module;

wherein the signal conversion module comprises:

a driving submodule, configured to be connected to the vibration unit, and to drive the vibration unit to generate vibration according to the processed vibration signal data;

a protocol processing submodule, configured to consult the preset protocol format with the adaptive protocol processing submodule, and to receive the preset protocol vibration signal data sent by the adaptive protocol processing submodule;

a mode switching submodule, configured to receive the preset vibration mode sent by the vibration mode matching submodule;

an adaptive conversion parameter generation submodule, configured to dock the driving submodule to acquire preset parameters of the vibration unit, and to generate conversion algorithm parameters according to the preset parameters; and a signal generation submodule, configured to generate the processed vibration signal data by the preset signal generation method according to the preset protocol vibration signal data, the preset vibration mode, and the preset parameters.

2. The system for converting a vibration signal according to claim 1, wherein the preset signal generation method comprises:

splitting and encoding the preset protocol vibration signal data to obtain code rate data;

encoding the code rate data according to the preset vibration mode and the conversion algorithm parameters to obtain waveform data; and outputting the waveform data as the processed vibration signal data capable of being identified by the vibration unit.

3. The system for converting a vibration signal according to claim 1, wherein the preset vibration mode is selected according to at least one of the following factors: an application size, an application name, and an application type of the corresponding application, and matched with corresponding vibration frequency data.

4. The system for converting a vibration signal according to claim 1, wherein the preset parameters comprise at least one of vibration parameters, a driving data format, and a driving unit temperature of the vibration unit.

5. The system for converting a vibration signal according to claim 1, wherein the format of the original vibration signal data is a Rumble format.

* * * * *